Nov. 24, 1959 J. M. MORRIS 2,914,313
RESILIENT MOUNT FOR CONVEYORS AND THE LIKE
Filed March 6, 1957
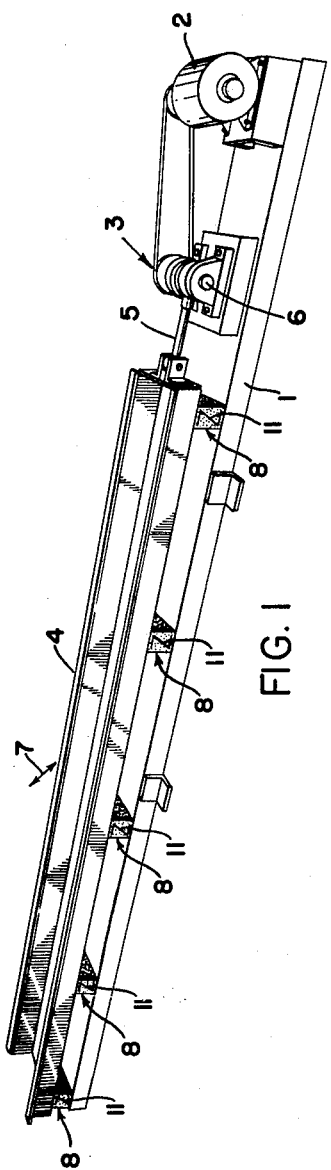
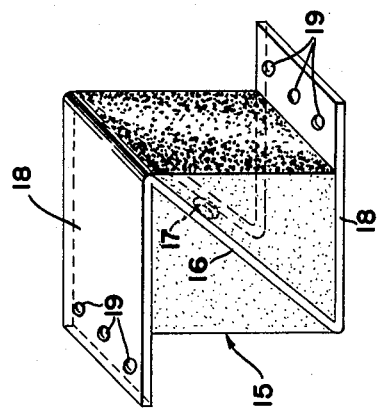
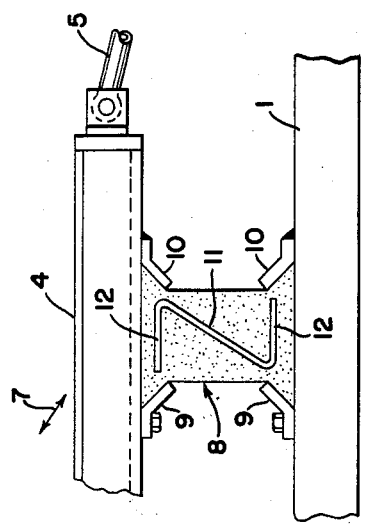
INVENTOR.
JOHN M. MORRIS
BY
Oberlin & Limbach
ATTORNEYS

# United States Patent Office 2,914,313
Patented Nov. 24, 1959

2,914,313

RESILIENT MOUNT FOR CONVEYORS AND THE LIKE

John M. Morris, Louisville, Ky., assignor to Carrier Conveyor Corporation, Louisville, Ky., a corporation of Kentucky Application March 6, 1957, Serial No. 644,235

1 Claim. (Cl. 267—1)

The present invention relates generally as indicated to a resilient mount for vibratory conveyors and like apparatus, and more particularly to improvements in resilient mounts of the general character disclosed in the copending application of Robert M. Carrier, Jr., Serial No. 456,818, filed September 17, 1954, now Patent No. 2,706,112, granted April 12, 1955.

Heretofore, directionally controlled vibration of vibratory conveyors, whether they be of the straight trough or spiral trough type, has been achieved by employing guide means for the conveyor in combination with resilient supports.

Thus, for example, leaf or plate springs may be employed to resiliently support a conveyor trough while also functioning as guides due to their longitudinal inflexibility and lateral inflexibility (in the plane of the springs), such springs having substantial lateral resilience of one end relative to the other in a plane perpendicular to the longitudinal axis and plane thereof.

Likewise, coil springs have been employed in combination with guide rods, the coil springs being alternately compressed and decompressed axially thereof along the desired path of vibration of the conveyor trough while the guide rods pivotally connected to the trough and conveyor base oscillate back and forth, both the coil springs and rods being required for the support of the conveyor, since, without the rods, the obliquely disposed coil springs would collapse by bending of their longitudinal axes. Similarly, without the springs, the conveyor trough would simply swing down about the guide rods against the base about the axes of the rods.

In the present case, and also in the aforesaid copending application, the resilient mounts comprise blocks of rubber or rubber-like material, each having a metal plate anchored therein at an angle such that the block-plate combination can vibrate only along the desired path while having substantial rigidity in all other directions.

It is one object of this present invention to provide such a resilient connector or resilient mount for vibratory conveyors in which the metal plate has oppositely extending flanges at its opposite ends effective to provide not only a wide bearing surface for the surrounding rubber or rubber-like block, but, in addition, serving to impart additional resilience through alternate tensioning and compressing of the rubber or rubber-like block between the flanges of the insert and the body of rubber or rubber-like material between said flanges and the oblique portion of the insert.

It is another object of this invention to provide a resilient mount of the character indicated in which the flanges of the insert extend beyond the rubber or rubber-like resilient element to constitute an anchoring means for connection of the mount to the base of the conveyor and to the conveyor trough respectively.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing:

Fig. 1 is a perspective view, somewhat diagrammatic in nature, illustrating a conveyor resiliently supported on the resilient mounts constituting the present invention;

Fig. 2 is a fragmentary elevation view on enlarged scale illustrating a portion of the conveyor trough and base with one of the several resilient mounts connected between the trough and base respectively; and Fig. 3 is a perspective view of a modified form of resilient mount according to the present invention having provision for securing of the same to the base and to the trough of the conveyor respectively.

Referring now more particularly to the drawing, and first to Fig. 1, the conveyor herein is illustratively shown as comprising an elongated base 1 on which an electric drive motor 2 and eccentric drive mechanism 3 is mounted adjacent one end.

Mounted in spaced relation above the remainder of the base 1 is a conveyor trough 4, the rear end of which is pivotally connected to the pitman arm 5 of the eccentric drive mechanism 3, whereby said trough will be vibrated in response to rotation of the eccentric drive shaft 6 through the electric drive motor 2 and the pulley and belt coupling of the drive motor shaft with the eccentric drive mechanism.

The conveyor trough 4 is resiliently supported for vibration along an oblique path 7 which is upwardly and forwardly with respect to the bottom of the trough, and which vibration is effective to progressively advance conveyable material from the right-hand end of the trough to the left-hand end through a directional tossing action induced by such vibration of the conveyor trough.

In this particular instance, there are five resilient mounts 8 substantially uniformly spaced apart and extending transversely between the trough 4 and the base 1, and connected thereto as by means of clamp elements 9 bolted respectively to the conveyor trough and to the base and cooperating with fixed clamping elements 10 which may be welded or otherwise secured to the trough 4 and base 1 respectively.

These resilient mounts 8 preferably extend across the entire width of the trough 4 and are in the form of blocks mdae of a resilient material such as rubber or rubber-like material, and have embedded therein metal plates 11 which are obliquely disposed rearwardly and upwardly so as to extend generally perpendicularly to the desired path of vibration 7, said plates herein being of Z-shaped cross-section, the top and bottom horizontally extending flanges 12 of which are preferably inset with respect to the top and bottom surfaces of the rubber or rubber-like blocks so as to provide extended bearing areas to prevent cutting through of the otherwise relatively narrow edges of the oblique portion of the insert 11.

In addition to the extended bearing surface provided by each flange 12 of the Z-shaped insert, which also preferably extends across the entire width of the block and thus of the conveyor trough 4, it is to be noted that the vibration of the trough along a path 7 which is generally perpendicular to the oblique web of the Z-shaped insert 11 induces alternate compression and tension in the generally triangular sections of the rubber or rubber-like material between the flanges 12 and web to thus afford certain desirable characteristics in the resilient mount as a whole which are not obtained merely by an obliquely disposed flat plate insert in the rubber block.

One such distinctive feature of the resilient mount having the present Z-shaped insert therein is that when one triangular rubber section is deformed in tension the opposite section is simultaneously deformed in compression; and therefore, the restoring forces, resulting from the energy internally held in the sections, are accumulative and act in synchronism to restore the trough to its neutral position.

Another such feature is that the Z-shaped insert acts to distribute the compressive forces, resulting from the weight of the pan to be vibrated and the material to be acted upon or conveyed, over a much larger area and reduces the unit stress and especially the stress concentration occurring around a single comparatively sharp edged oblique insert alone. Hence the probability of fatigue failure of the elastomer is greatly reduced.

The modified form of resilient mount 15 according to the present invention as illustrated in Fig. 3 again comprises a Z-shaped insert 16 in a rubber block; and, if desired, the web thereof may be provided with one or more openings 17 therethrough for securely anchoring the rubber and insert together.

In the Fig. 3 form of resilient mount, the flanges 18 of the insert are extending beyond the opposite faces of the rubber block, and such extended flanges are formed with openings 19 by means of which the resilient mount 15 may be securely bolted or otherwise secured in place between the conveyor trough 4 and the base 1 of the conveyor. This Fig. 3 modification has the same attributes as that illustrated in Figs. 1 and 2 insofar as the foregoing features are concerned; and, therefore, repetition of these features and how they are obtained is not believed necessary.

In a specific example, a conveyor trough 4 of ¼" thick metal of 12" width, 4" depth, and 12' length was supported on five resilient mounts 8, each of 3½" width in the longitudinal direction of the conveyor trough and of 6" length crosswise of the conveyor trough, the particular material of the mount being neoprene rubber of 50 durometer.

Molded in each rubber block was a Z-shaped steel insert formed of 1/16" thick steel stock with flanges of 2" width and a web extending between the flanges 12 at an angle of approximately 60° from horizontal for vibration of the conveyor trough 4 along a path 7 obliquely upward and forwardly at an angle of 30° with respect to the trough bottom. The flanges 12 aforesaid were inset from the top and bottom surfaces of the block a distance of ⅛", the height of the rubber block being 3". The insert 11 was bonded to the rubber and additionally anchoring openings were provided in the oblique web and in the flanges 12 thereof.

A conveyor thus constructed was operative when vibrated at a frequency of 800 cycles per minute and at an amplitude of 3/16" to convey sand at the rate of 20 feet per minute and 3000 pounds per hour.

Comparable results were obtained using the resilient mount of Fig. 3.

Other modes of applying the principle of the invention may be employed, change being made as regards the details described, provided the features stated in the following claim, or the equivalent of such, be employed.

I therefore particularly point out and distinctly claim as my invention:

A resilient mount for a vibratory conveyor and the like comprising a block of rubber-like material adapted to be positioned between a conveyor base and a material handling member, and a reinforcement in said block of generally Z-shaped cross-section to render said mount elastically deformable along a path which is generally transverse to the flange-joining web of said reinforcement, said block having portions thereof between such flanges and such opposite faces that are under compression loading when positioned to support a material handling member in spaced relation above a conveyor base.

References Cited in the file of this patent
UNITED STATES PATENTS 2,706,112   Carrier _____ Apr. 12, 1955
2,795,318   Morris _____ June 11, 1957